US012536594B2

(12) United States Patent
Ulin et al.

(10) Patent No.: US 12,536,594 B2
(45) Date of Patent: Jan. 27, 2026

(54) HAIL SEVERITY PREDICTIONS USING ARTIFICIAL INTELLIGENCE

(71) Applicant: Zesty.ai, Inc., Oakland, CA (US)

(72) Inventors: Michael Ulin, Portland, OR (US); Masoumeh Rezaei Abkenar, Brossard (CA); Bryn Ronalds, Montreal (CA); Frederick Dube Fortier, Oakland, CA (US); Kristie Sarkar, San Francisco, CA (US)

(73) Assignee: Zesty.ai, Inc., San Francisco, CA (US)

( * ) Notice: Subject to any disclaimer, the term of this patent is extended or adjusted under 35 U.S.C. 154(b) by 319 days.

(21) Appl. No.: 17/966,523

(22) Filed: Oct. 14, 2022

(65) Prior Publication Data

US 2024/0127348 A1 Apr. 18, 2024

(51) Int. Cl.
| | | |
|---|---|---|
| *G06Q 40/00* | (2023.01) |
| *G06N 3/049* | (2023.01) |
| *G06N 3/08* | (2023.01) |
| *G06Q 40/08* | (2012.01) |
| *G06Q 50/163* | (2024.01) |
| *G06V 20/10* | (2022.01) |

(52) U.S. Cl.
CPC ............ *G06Q 40/08* (2013.01); *G06N 3/049* (2013.01); *G06N 3/08* (2013.01); *G06Q 50/163* (2013.01); *G06V 20/10* (2022.01)

(58) Field of Classification Search
CPC ...... G06Q 40/08; G06Q 50/163; G06N 3/049; G06N 3/08; G06N 20/00; G06V 20/10; G06V 10/764; G06V 10/82; G06V 20/13; G06V 20/17; G06V 20/176

USPC ................................ 705/4, 39, 5, 38, 37, 26
See application file for complete search history.

(56) References Cited

U.S. PATENT DOCUMENTS

| | | |
|---|---|---|
| 4,550,376 A | 10/1985 | Maciejczak |
| 5,742,335 A | 4/1998 | Cannon |
| 5,794,216 A | 8/1998 | Brown |
| 7,958,034 B2 | 6/2011 | Ehrhart |

(Continued)

FOREIGN PATENT DOCUMENTS

| | | |
|---|---|---|
| CN | 201620636 U | 11/2010 |
| WO | 20056446 A1 | 3/2020 |

(Continued)

OTHER PUBLICATIONS

Planning for Atmospheric Hazards and Disaster Management Under Changing Climate Conditions; 2006 IEEE EIC Climate Change Conference (pp. 1-9); H. Auld, D. MacIver, J. Klaassen, N. Comer, B. Tugwood; May 10, 2006. (Year: 2006).*

(Continued)

*Primary Examiner* — Tien C Nguyen
(74) *Attorney, Agent, or Firm* — Patent Law Works LLP

(57) ABSTRACT

The disclosure includes systems and methods for identifying, using one or more processors, a set of properties that experienced hail damage; determining, using the one or more processors, a first set of features associated with each property in the set of properties, the first set of features including one or more hail features at a location of the property, one or more property features describing an associated property, and one or more damage values; training, using the one or more processors, a first damage severity model; and validating, using the one or more processors, the first damage severity model.

20 Claims, 10 Drawing Sheets

(56) References Cited

U.S. PATENT DOCUMENTS

| | | | |
|---|---|---|---|
| 8,078,436 B2 | 12/2011 | Pershing | |
| 8,081,795 B2* | 12/2011 | Brown | G06V 20/13 |
| | | | 382/141 |
| 8,170,840 B2 | 5/2012 | Pershing | |
| 8,209,152 B2 | 6/2012 | Pershing | |
| 8,280,633 B1* | 10/2012 | Eldering | G06Q 40/08 |
| | | | 702/3 |
| 8,289,160 B1 | 10/2012 | Billman | |
| 8,497,905 B2 | 7/2013 | Nixon | |
| 8,542,880 B2 | 9/2013 | Thornberry et al. | |
| 8,774,525 B2 | 7/2014 | Pershing | |
| 8,775,219 B2 | 7/2014 | Swanson et al. | |
| 8,818,770 B2 | 8/2014 | Pershing | |
| 8,823,732 B2 | 9/2014 | Adams et al. | |
| 8,825,454 B2 | 9/2014 | Pershing | |
| 9,046,759 B1 | 6/2015 | Tarlinton | |
| 9,147,287 B2 | 9/2015 | Ciarcia | |
| 9,489,397 B1 | 11/2016 | Olson | |
| 9,536,148 B2 | 1/2017 | Gross | |
| 9,542,417 B2 | 1/2017 | Hieronymus et al. | |
| 9,648,355 B2 | 5/2017 | Roskowski | |
| 9,721,400 B1 | 8/2017 | Oakes, III | |
| 9,824,290 B2 | 11/2017 | Millin et al. | |
| 9,875,509 B1 | 1/2018 | Harvey et al. | |
| 9,911,228 B2 | 3/2018 | Pershing et al. | |
| 9,959,581 B2 | 5/2018 | Pershing | |
| 10,025,989 B2 | 7/2018 | Drako | |
| 10,083,616 B2 | 9/2018 | Bauer | |
| 10,102,586 B1 | 10/2018 | Marlow et al. | |
| 10,127,440 B1 | 11/2018 | Drako | |
| 10,134,092 B1* | 11/2018 | Harvey | G06V 20/176 |
| 10,311,302 B2 | 6/2019 | Kottenstette et al. | |
| 10,387,582 B2 | 8/2019 | Lewis et al. | |
| 10,440,229 B2 | 10/2019 | Drako | |
| 10,453,147 B1 | 10/2019 | Davis | |
| 10,503,843 B2 | 12/2019 | Keane | |
| 10,505,923 B2 | 12/2019 | Drako et al. | |
| 10,529,029 B2 | 1/2020 | Okazaki | |
| 10,534,784 B2 | 1/2020 | Cousins et al. | |
| 10,650,285 B1 | 5/2020 | Okazaki | |
| 10,671,648 B2 | 6/2020 | Barrow et al. | |
| 10,740,684 B1 | 8/2020 | Wani | |
| 10,755,357 B1 | 8/2020 | Davis | |
| 10,915,829 B1 | 2/2021 | Wani | |
| 10,977,490 B1* | 4/2021 | Bokshi-Drotar | G06T 7/0004 |
| 11,030,491 B2 | 6/2021 | Okazaki | |
| 11,131,597 B1* | 9/2021 | Oakes, III | G06T 17/00 |
| 11,195,058 B2 | 12/2021 | Okazaki | |
| 11,347,976 B2 | 5/2022 | Okazaki | |
| 11,488,255 B1* | 11/2022 | Mast | G01W 1/14 |
| 11,551,040 B2 | 1/2023 | Okazaki | |
| 11,593,887 B1* | 2/2023 | Gaudin | G06Q 40/08 |
| 11,922,284 B1 | 3/2024 | Pirozzi | |
| 12,093,869 B1 | 9/2024 | Kownacki | |
| 2008/0208637 A1 | 8/2008 | McKay et al. | |
| 2010/0034483 A1 | 2/2010 | Giuffrida et al. | |
| 2011/0031309 A1 | 2/2011 | Duhaime et al. | |
| 2011/0033110 A1 | 2/2011 | Shimamura et al. | |
| 2011/0064308 A1 | 3/2011 | Stein et al. | |
| 2013/0060600 A1 | 3/2013 | Schoolman | |
| 2013/0226667 A1 | 8/2013 | Terrazas et al. | |
| 2013/0262029 A1 | 10/2013 | Pershing | |
| 2013/0321392 A1 | 12/2013 | Van Der Merwe | |
| 2014/0132409 A1 | 5/2014 | Billman et al. | |
| 2015/0120332 A1 | 4/2015 | Mildenhall et al. | |
| 2015/0120333 A1 | 4/2015 | Fiete et al. | |
| 2015/0186953 A1 | 7/2015 | Gross | |
| 2015/0193881 A1 | 7/2015 | Emison | |
| 2015/0228031 A1 | 8/2015 | Emison et al. | |
| 2015/0235322 A1 | 8/2015 | Emison | |
| 2015/0254555 A1 | 9/2015 | Williams, Jr. et al. | |
| 2015/0302529 A1 | 10/2015 | Jagannathan | |
| 2015/0317740 A1 | 11/2015 | Emison | |
| 2016/0004571 A1 | 1/2016 | Smith | |
| 2016/0048925 A1 | 2/2016 | Emison et al. | |
| 2016/0048934 A1 | 2/2016 | Gross | |
| 2016/0055594 A1 | 2/2016 | Emison | |
| 2016/0063516 A1 | 3/2016 | Terrazas et al. | |
| 2016/0360181 A1 | 12/2016 | Drako | |
| 2017/0039307 A1* | 2/2017 | Koger | G06F 30/23 |
| 2017/0076438 A1 | 3/2017 | Kottenstette et al. | |
| 2017/0084077 A1 | 3/2017 | Liu et al. | |
| 2017/0192424 A1 | 7/2017 | Poole et al. | |
| 2017/0228743 A1 | 8/2017 | Cousins et al. | |
| 2017/0352100 A1 | 12/2017 | Shreve et al. | |
| 2018/0089763 A1 | 3/2018 | Okazaki | |
| 2018/0201257 A1 | 7/2018 | Dudar | |
| 2018/0276527 A1 | 9/2018 | Motoya | |
| 2018/0292573 A1 | 10/2018 | Cecelski et al. | |
| 2018/0324595 A1 | 11/2018 | Shima | |
| 2018/0332004 A1 | 11/2018 | Drako et al. | |
| 2018/0336452 A1 | 11/2018 | Tschernezki et al. | |
| 2018/0348766 A1 | 12/2018 | Lewis et al. | |
| 2019/0064346 A1 | 2/2019 | Jones et al. | |
| 2019/0066217 A1 | 2/2019 | Stoner, Jr. et al. | |
| 2019/0088032 A1 | 3/2019 | Milbert et al. | |
| 2019/0114717 A1* | 4/2019 | Labrie | G06Q 40/08 |
| 2019/0138849 A1 | 5/2019 | Zhang | |
| 2019/0147247 A1 | 5/2019 | Harris et al. | |
| 2019/0147749 A1 | 5/2019 | Lewis et al. | |
| 2019/0162875 A1 | 5/2019 | Cousins et al. | |
| 2019/0188516 A1 | 6/2019 | Porter et al. | |
| 2019/0197311 A1 | 6/2019 | Sun et al. | |
| 2019/0228251 A1 | 7/2019 | Melendez et al. | |
| 2019/0228362 A1 | 7/2019 | Anagnostou et al. | |
| 2019/0228477 A1 | 7/2019 | Carter et al. | |
| 2019/0251397 A1 | 8/2019 | Tremblay et al. | |
| 2019/0295328 A1 | 9/2019 | Santos | |
| 2019/0304026 A1 | 10/2019 | Lyman et al. | |
| 2019/0318440 A1 | 10/2019 | Wani et al. | |
| 2019/0370894 A1 | 12/2019 | Meyers | |
| 2019/0378216 A1 | 12/2019 | Fiete et al. | |
| 2019/0384866 A1 | 12/2019 | Porter et al. | |
| 2019/0385363 A1 | 12/2019 | Porter et al. | |
| 2020/0004901 A1 | 1/2020 | Esteban | |
| 2020/0005075 A1 | 1/2020 | Porter et al. | |
| 2020/0005536 A1 | 1/2020 | Esteban et al. | |
| 2020/0082168 A1 | 3/2020 | Fathi et al. | |
| 2020/0082615 A1 | 3/2020 | Reed et al. | |
| 2020/0098130 A1 | 3/2020 | Porter et al. | |
| 2020/0098170 A1 | 3/2020 | Sehgal et al. | |
| 2020/0100066 A1 | 3/2020 | Lewis et al. | |
| 2020/0110972 A1 | 4/2020 | Esteban et al. | |
| 2020/0117959 A1 | 4/2020 | Sargent | |
| 2020/0134573 A1* | 4/2020 | Vickers | G06F 16/29 |
| 2020/0143212 A1 | 5/2020 | Okazaki | |
| 2020/0151500 A1 | 5/2020 | Kossyk et al. | |
| 2020/0159252 A1 | 5/2020 | Giuffrida et al. | |
| 2020/0160599 A1 | 5/2020 | Nunez et al. | |
| 2020/0167870 A1 | 5/2020 | Isaacson et al. | |
| 2021/0027532 A1 | 1/2021 | Lin | |
| 2021/0089839 A1 | 3/2021 | Okazaki | |
| 2021/0118117 A1 | 4/2021 | Albrecht et al. | |
| 2021/0133891 A1* | 5/2021 | Jagannathan | G06Q 40/08 |
| 2021/0358049 A1 | 11/2021 | Schwartz | |
| 2021/0390624 A1 | 12/2021 | Hayward | |
| 2022/0051344 A1 | 2/2022 | Dhuvur | |
| 2023/0116402 A1 | 4/2023 | Spader | |
| 2024/0168198 A1 | 5/2024 | Cook | |

FOREIGN PATENT DOCUMENTS

| | | |
|---|---|---|
| WO | WO2024002692 A1 | 1/2024 |
| WO | WO2024124062 A1 | 6/2024 |

OTHER PUBLICATIONS

Predicting Storm Outages Through New Representations of Weather and Vegetation; IEEE Access (vol. 7, 2019, pp. 29639-29654); Diego Cerrai, David W. Wanik, Md Abul Ehsan Bhuiyan, Xinxuan Zhang, Jaemo Yang, Maria E. B. Frediani, Emmanouil N. Anagnostou; Jan. 1, 2019. (Year: 2019).*

(56) References Cited

OTHER PUBLICATIONS

The application of artificial neural networks for wildfire risk prediction; 2016 International Conference on Robotics and Automation for Humanitarian Applications (RAHA) (2016, pp. 1-6); Shruti Lall, Bonolo Mathibela; Dec. 18, 2016. (Year: 2016).*

Mueller, M., et al., "Discrimination between roofing materials and streets within urban areas based on hyperspectral, shape, and context information," 2003 2nd GRSS/ISPRS Joint Workshop on Remote Sensing and Data Fusion over Urban Areas, 2003, pp. 196-200, doi: 10.1109/DFUA.2003.1219986. Abstract only. 2 pg.

PCT International Search Report and Written Opinion, International Application No. PCT/US2021/045953 Zesty.AI, Inc., filing date Aug. 13, 2021, date of mailing Nov. 16, 2021, 9 pgs.

PCT International Search Report and Written Opinion, International Application No. PCT/US2021/062628 Zesty.AI, Inc., International filing date Dec. 9, 2021, date of mailing Feb. 24, 2022, 16 pgs.

Fatemeh Alidoost, NPL, "2D Image-to-3D Model: Knowledge-Based 3D Building Reconstruciton (3DBR) Using Single Aerial Images and Convolutional Neural Networks (CNNs)", Sep. 23, 2019 (Year: 2019).

Jeremy Castagno, NPL, "Roof Shape Classification from LiDAR and Satellite Image Data Fusion Using Supervised Learning", Nov. 15, 2018 (Year: 2018).

Tahnmineh Partovi, NPL, "Automatic 3-D Building Model Reconstruction from Very High Resolution Stereo Satellite Imagery", Jul. 11, 2019 (Year: 2019).

Tirone et al. A Machine Learning Approach to Improve the Usability of Severe Thunderstorm Wind Reports. Mar. 31, 2024 (Mar. 31, 2024). [retrieved on Sep. 15, 2025]. Retrieved from the Internet: <URL: https://journals.arnetsoc.org/view/journals/bams/105/3/BAMS-D-22-0268.1.pdf>, pp. E623-E638.

PCT International Search Report and Written Opinion, International Application No. PCT/US25/39682 Zesty.AI, Inc., International filing date Jul. 29, 2025, date of mailing Sep. 22, 2025, 16 pgs.

* cited by examiner

HAIL SEVERITY PREDICTIONS USING ARTIFICIAL INTELLIGENCE

BACKGROUND

The present disclosure generally relates to systems and methods for determining predictions associated with hail using artificial intelligence. In particular, the present disclosure relates to systems and methods for determining the likelihood and/or extent of property damage from hail.

Climate events, such as severe convective storms, e.g., hail, cause damage. However, there are no ways of accurately predicting the risk posed by a climate event to a property, much less ways to accurately predict the risk posed by a climate event to a property that accounts for the property-specific attributes of that property.

SUMMARY

This specification relates to methods and systems for making predictions associated with hail. In general, an innovative aspect of the subject matter described in this disclosure may be implemented in methods that include identifying, using one or more processors, a set of properties that experienced hail damage; determining, using the one or more processors, a first set of features associated with each property in the set of properties, the first set of features including one or more hail features at a location of the property, one or more property features describing an associated property, and one or more damage values; training, using the one or more processors, a first damage severity model; and validating, using the one or more processors, the first damage severity model.

Other implementations of one or more of these aspects include corresponding systems, apparatus, and computer programs, configured to perform the actions of the methods, encoded on computer storage devices.

These and other implementations may each optionally include one or more of the following features. For example, the features may include receiving a location; applying the first damage severity model; and presenting a damage severity. For example, the damage severity is one or more of: a roof area damaged, a claim cost, and a cost of replacement. For example, the features may further include determining, based on a determined damage severity, one or more of: a remedial action to reduce a risk of hail; whether to approve or deny hail insurance coverage or an insurance claim; an insurance premium associated with the location, an adjustment to an insurance premium associated with location; and to warn one or more of a property owner, resident, financier and insurer associated with the location of a risk of damage posed by hail.

For example, the set of properties that experienced hail damage includes one or more of a first property from hail claims data and a second property from building permit data, where a building permit associated with the second property indicates hail. For example, identifying the set of properties that experienced hail damage comprises: obtaining an initial set of properties that experienced hail damage; eliminating, from the initial set of properties, properties unassociated with a damage value; eliminating, from the initial set of properties, under construction; and identifying, as the set of properties that experienced hail damage, a remaining set of properties. For example, the threshold is associated with one or more of a maximum roof size, a minimum roof size, a maximum damage value, a minimum damage value, and an outlier. For example, the first damage severity model is a regression model. For example, the first damage severity model is a classifier. For example, the first set of features includes one or more of a roof area, a building area, a vegetation density, a roof material, a roof quality, a roof height, a roof pitch, presence of a skylight, a portion of roof covered by skylights, presence of a solar panel, a portion of roof covered by solar panels, a number of roof facets, a roof shape, a land cover code, a temperature, a precipitation type or metric, and an elevation.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
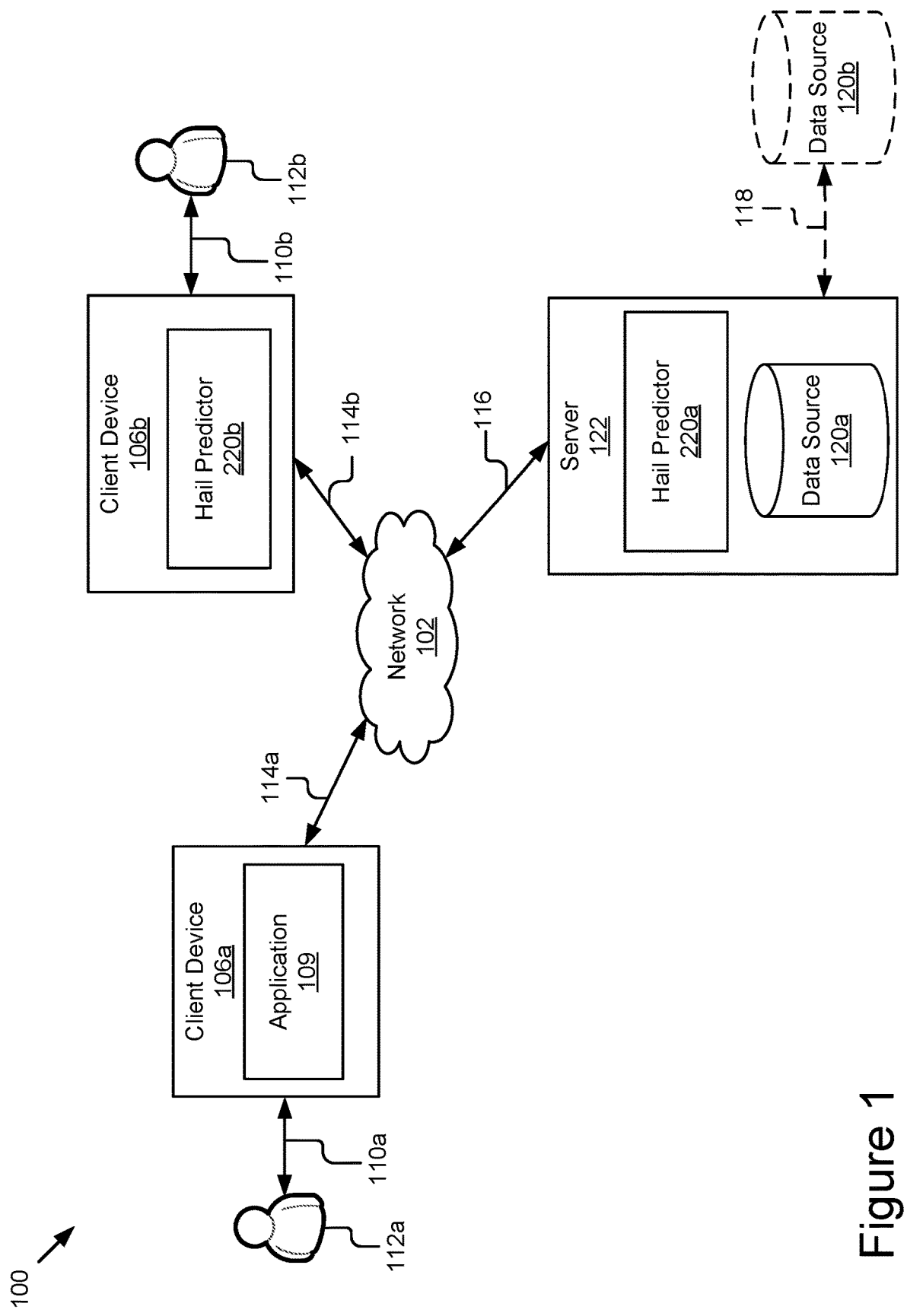
FIG. 1 is a block diagram of one example system for hail prediction in accordance with some implementations.

The techniques introduced herein overcome the deficiencies and limitations of the prior art, at least in part, by providing systems and methods for determining hail risk using artificial intelligence. In some implementations, the systems and methods of the present disclosure create and use climate model(s) to determine the probability that a location/property will be affected by hail and make predictions about hail events. In some implementations, the present disclosure also creates and uses the models to determine a likelihood of damage (or a claim for damage) and the severity of the damage (or of the claim for damage) from a climate event, such as hail.

While the present disclosure is described below primarily in the context of hail, the models, systems, and methods of the present disclosure may be adapted to other climate events. For example, in other implementations, the models, systems, and methods of the present disclosure may be used in a similar way to determine the probability of damage and the extent of damage from climate events including, but not limited to, winds, tornadoes, hurricanes or cyclones, blizzards, dust storms, ice storms, earthquakes, lightning, etc., even though the present disclosure is described primarily in the context of hail. It should be understood that the models, systems, and methods may be modifiable, or adjustable, and applicable to other climate events, and remain within the scope of the present disclosure.

One particular advantage of the systems and methods of the present disclosure is the use of artificial intelligence or machine learning. While the systems and methods of the present disclosure are described below in the context of some implementations using particular algorithms and/or types (e.g., supervised) of machine learning, it should be understood that the systems and methods of the present disclosure may be implemented using other machine learning approaches such as, but not limited to semi-supervised learning, unsupervised learning, reinforcement learning, topic modeling, dimensionality reduction, meta-learning, and deep learning.

The systems and methods of the present disclosure have a number of advantages over prior art systems and methods. The systems and methods of the present disclosure advantageously leverage property-specific information such as vegetation, buildings materials, etc., to predict a likelihood (e.g., frequency) of damage from a climate event (e.g., hail) and an extent (or severity of data) when the property is involved in a climate event (e.g., hail). Additionally, some implementations leverage machine learning to derive such property-specific information (occasionally referred to herein as feature data) efficiently and accurately from readily available data sources (e.g., aerial imagery) which may eliminate the need for human onsite inspection. All of these above advantages are achieved by the systems and methods of the present disclosure, which include:

Methods for generating climatological models (e.g., describing expected hail size and/or frequency at a location) using statistical methods (e.g., AI/ML).

Methods for generating a damage frequency model (e.g., to predict a damage frequency or expected likelihood of a hail claim) using statistical methods (e.g., AI/ML).

Methods for generating a damage severity model (e.g., describing an extent of the damage expected or claimed) using statistical methods (e.g., AI/ML).

Example System

FIG. 1 is a block diagram of one example system for making predictions associated with hail using artificial intelligence in accordance with some implementations. As depicted, system 100 includes server 122 and client devices 106a and 106b coupled for electronic communication via network 102. The client devices 106a or 106b may occasionally be referred to herein individually as client device 106 or collectively as client devices 106. Although two client devices 106a and 106b are shown in FIG. 1, it should be understood that there may be any number of client devices 106.

A client device 106 is a computing device that includes a processor, memory, and network communication capabilities (e.g., a communication unit). The client device 106 is coupled for electronic communication to network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smartphones, etc.), tablets, laptops, desktops, netbooks, portable media players, personal digital assistants, etc.

It should be understood that system 100, depicted in FIG. 1, is provided by way of example, and system 100 and/or further systems contemplated by this present disclosure may include additional and/or fewer components, may combine components and/or divide one or more of the components into additional components, etc. For example, system 100 may include any number of client devices 106, networks 102, or servers 122.

In some implementations, the client device 106 includes an application 109. Depending on the implementation, the application may include a dedicated application or a browser (e.g., a web browser such as Chrome, Firefox, Edge, Explorer, Safari, or Opera). In some implementations, a user 112 accesses the features and functionalities of the climate risk assessor 220a/b via the application 109.

The network 102 may be a conventional type, wired and/or wireless, and may have numerous different configurations, including a star configuration, token ring configuration, or other configurations. For example, network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

Server 122 is a computing device that includes a hardware and/or virtual server that includes a processor, memory, and network communication capabilities (e.g., a communication unit). Server 122 may be communicatively coupled to network 102, as indicated by signal line 116. In some implementations, server 122 may send and receive data to and from other entities of the system 100 (e.g., one or more client devices 106). Some implementations for server 122 are described in more detail below with reference to FIG. 2.

Data source 120a is a non-transitory memory that stores data for providing the functionality described herein. The data source 120a/b may include one or more non-transitory computer-readable mediums for storing the data. In some implementations, the data source 120a may be incorporated with the memory of server 122, or the data source 120b may be distinct from server 122 and coupled thereto. In some implementations, the data source 120 may be remote from server 122, as illustrated by instance 120b. For example, in some implementations (not shown), the data source 120b may include network-accessible storage and/or one or more third-party data sources that store and maintain data used to provide the functionality described herein.

The data source 120 may be a dynamic random-access memory (DRAM) device, a static random-access memory (SRAM) device, a flash memory, or some other memory device. In some implementations, the data source 120 may include a database management system (DBMS) operable on server 122. For example, the DBMS could include a structured query language (SQL) DBMS, a NoSQL DMBS, various combinations thereof, etc. In some instances, the DBMS may store data in multi-dimensional tables comprised of rows and columns and manipulate, e.g., insert, query, update and/or delete, rows of data using programmatic operations. In other implementations, the data source 120a/b also may include a non-volatile memory or similar permanent storage device and media, including a hard disk drive, a CD-ROM device, a DVD-ROM device, a DVD-RAM device, a DVD-RW device, a flash memory device, or some other mass storage device for storing information on a more permanent basis.

The data source 120 stores data for providing the functionality described herein. The data may vary based on the implementation and climate event(s) being assessed. Examples of data that data source 120 may store include, but are not limited to, one or more image data (e.g., aerial images, satellite images, etc.), damage or loss data, insurance data, historic climate event data, weather data (e.g., average temperature, average hail precipitation annually, etc.), boundary definitions (e.g., flood zones), emergency service locations (e.g., fire department locations), and topographical or other maps.

Other variations and/or combinations are also possible and contemplated. It should be understood that system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, depending on the implementation, the hail predictor 220 may be entirely server-side, i.e., at hail predictor 220*a*, entirely client-side, i.e., at hail predictor 220*h*, or distributed to between the client-side and server-side, i.e., at hail predictor 220*a* and hail predictor 220*b*.

As another example, while only a single server 122 is illustrated, server 122 may represent a plurality of servers (e.g., a server farm or distributed cloud environment), and server 122, in some implementations, may, therefore, include multiple instances (e.g., in different hardware servers, virtual machines, or containers) of the hail predictor 220*a*.

Figure 2:
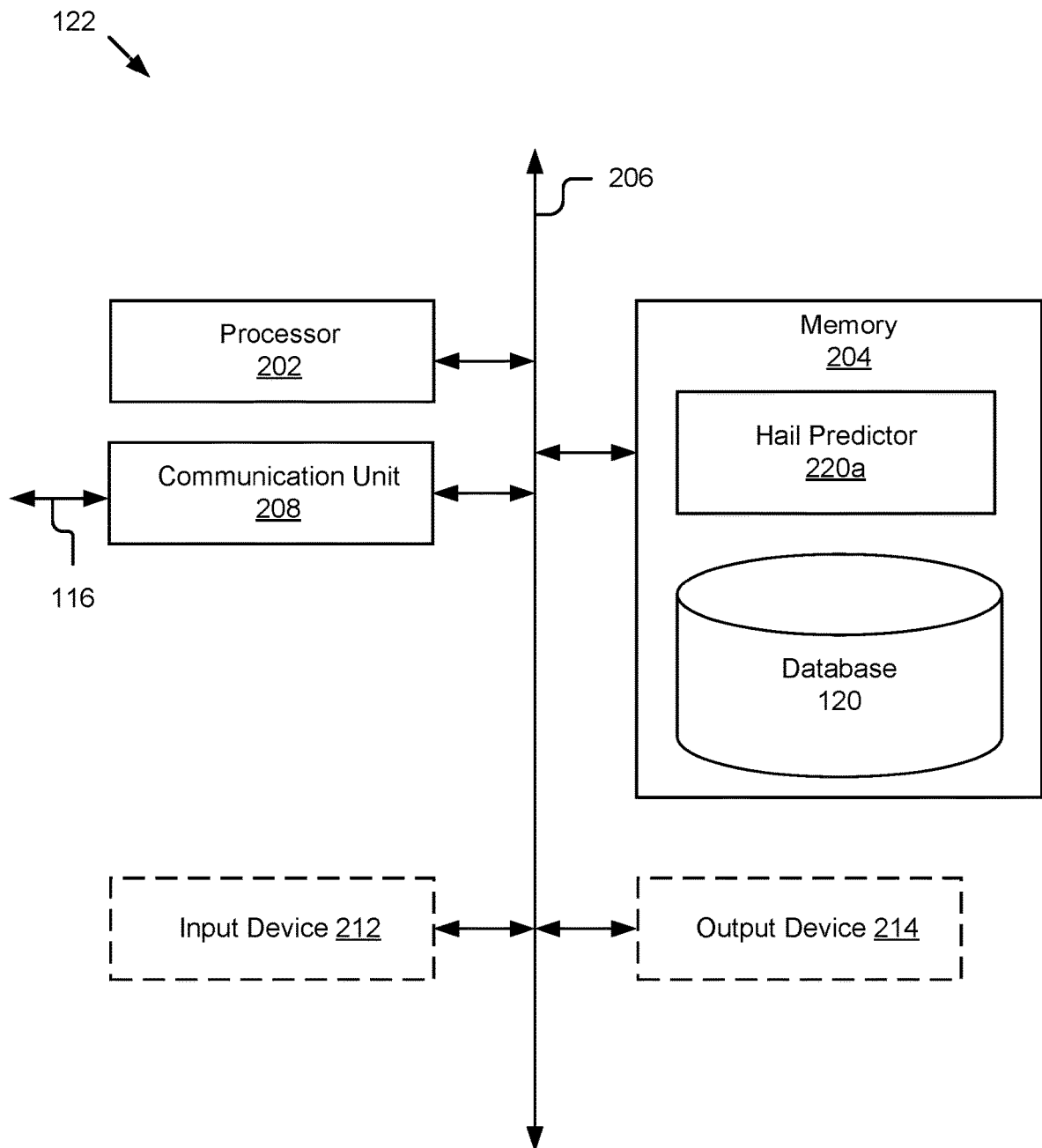
FIG. 2 is a block diagram of an example server in accordance with some implementations.

FIG. 2 is a block diagram of an example server 122, including an instance of the hail predictor 220*a*. In the illustrated example, server 122 includes a processor 202, a memory 204, a communication unit 208, and, optionally, an input device 212 and an output device 214.

The processor 202 may execute software instructions by performing various input/output, logical, and/or mathematical operations. The processor 202 may have various computing architectures to process data signals, such as a complex instruction set computer (CISC) architecture, a reduced instruction set computer (RISC) architecture, and/or an architecture implementing a combination of instruction sets. The processor 202 may be physical and/or virtual. Processor 202 may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. Bus 206 may couple the processor 202 to the other components of the server 122 including, for example, the memory 204, and the communication unit 208.

Memory 204 may store and provide access to data for the other components of server 122. Memory 204 may be included in a single computing device or distributed among a plurality of computing devices. In some implementations, memory 204 may store instructions and/or data that may be executed by processor 202. The instructions and/or data may include code for performing the techniques described herein. For example, in some implementations, memory 204 may store an instance of the hail predictor 220*a*. Memory 204 is also capable of storing other instructions and data, including, for example, an operating system, hardware drivers, other software applications, databases (e.g., data source 120), etc. The memory 204 may be coupled to bus 206 for communication with processor 202 and the other components of server 122.

Memory 204 may include one or more non-transitory computer-usable (e.g., readable, writeable) devices, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, memory 204 may include one or more volatile memory and non-volatile memory. It should be understood that memory 204 may be a single device or may include multiple types of devices and configurations.

The communication unit 208 is hardware for receiving and transmitting data by linking processor 202 to network 102 and other processing systems. Communication unit 208 receives data and transmits the data via network 102. The communication unit 208 is coupled to bus 206. In some implementations, the communication unit 208 may include a port for direct physical connection to network 102 or to another communication channel. For example, communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network, such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to network 102 for the distribution of files and/or media objects using standard network protocols such as TCP/IP, HTTP, HTTPS, and SMTP as will be understood to those skilled in the art.

The input device 212 may include any device for inputting information into server 122. In some implementations, the input device 212 may include one or more peripheral devices. For example, the input device 212 may include a keyboard, a pointing device, a microphone, an image/video capture device (e.g., a camera), a touch-screen display integrated with the output device 214, etc.

The output device 214 may be any device capable of outputting information from server 122. The output device 214 may include one or more of a display (LCD, OLED, etc.), a printer, a 3D printer, a haptic device, an audio reproduction device, a touch-screen display, a remote computing device, etc. In some implementations, the output device 214 is a display that may display electronic images and data output by a processor for presentation to a user.

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

Figure 3:
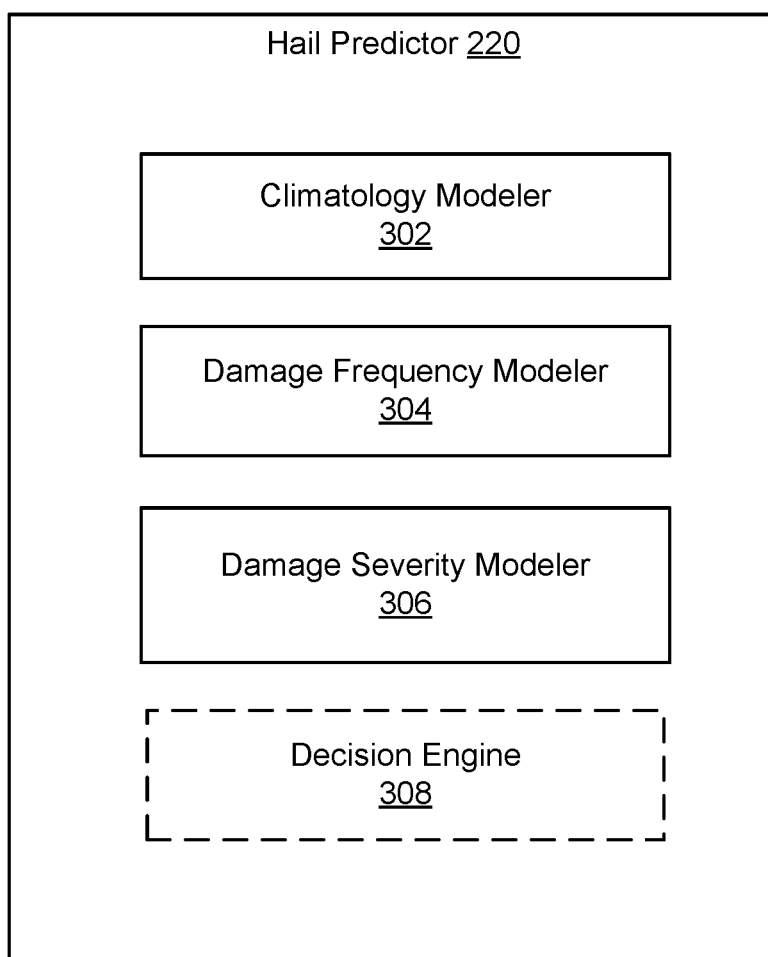
FIG. 3 is a block diagram of an example hail predictor in accordance with some implementations.

Referring now to FIG. 3, a block diagram of an example instance of the hail predictor 220 is illustrated in accordance with some implementations. In the illustrated implementation, the hail predictor 220 includes a climatology modeler 302, a damage frequency modeler 304, a damage severity modeler 306, and a decision engine 308. In some implementations, the decision engine 308 is optional and may be omitted. In some implementations, the components 302, 304, 306, and 308 of the hail predictor 220 are communicatively coupled with one another and/or other components of the system 100 or server 122, such as a data source 120.

In some implementations, the climatology modeler 302 trains, validates and applies one or more climatology models to predict one or more of an occurrence of hail at a requested location and at least one characteristic of hail at a requested location. Depending on the implementation, a probability of an occurrence of hail may describe the probability of hail occurring (at all) at the requested location or the probability of hail that has the potential to cause damage (e.g., above a threshold size of hail stone) occurring. In some implementations, the characteristics of the hail include, but are not limited to, one or more of an average hail size and a maximum hail size. The climatology modeler 302 is described further below with reference to FIG. 4 in accordance with some implementations.

In some implementations, the damage frequency modeler 304 trains, validates and applies one or more models to determine the probability of hail damage occurring. In some implementations, the damage frequency modeler 304 uses a proxy for actual hail damage, and the damage frequency modeler 304 determines a probability of a claim for the damage being made. In some implementations, the damage frequency modeler 304 uses features of one or more of the locations, the structures, and the surroundings to beneficially increase the accuracy of the predictions associated with hail damage made by the damage frequency modeler 304. The damage frequency modeler 304 is described further below with reference to FIG. 5 in accordance with some implementations.

In some implementations, the damage severity modeler 306 trains, validates and applies one or more models to predict the severity of hail damage. Depending on the implementation, the damage severity modeler 306 may determine the severity using one or more measures including, but not limited to; a roof area damaged, a roof area to be replaced, a replacement cost, etc. In some implementations, the damage severity modeler 306 uses features of one or more of the locations, the structures, and the surroundings to beneficially increase the accuracy of the predictions associated with the hail damage made by the damage severity modeler 306. The damage severity modeler 306 is described further below with reference to FIG. 7 in accordance with some implementations.

In some implementations, the hail predictor 220 includes an optional decision engine 308. In some implementations, the decision engine 308 may be omitted or present in a separate component or system, e.g., in a third-party system, such as a server, or other computing devices, associated with an insurer (not shown).

The decision engine 308 applies information generated by one or more of the climatology modeler 302, the damage frequency modeler 304, and the damage severity modeler 306 and makes one or more decisions based thereon. In some implementations, a decision is to initiate or take action. Examples of actions may include, but are not limited to, determining a remedial action to reduce risk, suggesting a remedial action, approving insurance coverage associated with the hail related risks and expected costs, denying insurance coverage associated with hail, identifying existing hail damage not covered by a future claim, approving or denying an insurance claim based on the absence or presence of prior (uncovered) hail damage, adjusting an insurance premium associated with hail, sending a warning of the hail risk (e.g. via phone, e-mail, SMS/MMS text, mail, etc.) to the property or an owner, resident, financer, or insurer of the property.

Figure 4:
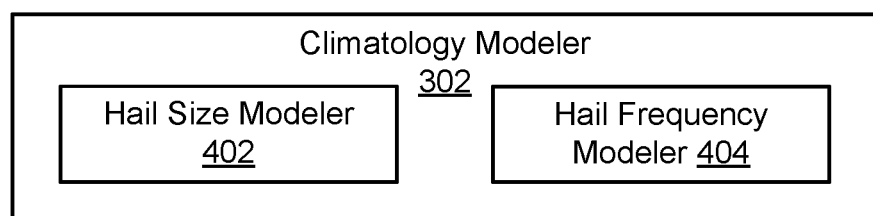
FIG. 4 is a block diagram of an example climatology modeler in accordance with some implementations.

In FIG. 4, a block diagram of an example climatology modeler 302 is illustrated in accordance with some implementations. In the illustrated implementation of FIG. 4, the climatology modeler includes a hail size modeler 402 and a hail frequency modeler 404.

The hail size modeler 402 obtains hail size data, trains and validates one or more models based on the hail data, and generates one or more predictions regarding hail size. The hail size modeler 402 obtains hail size data. In some implementations, the hail size data is obtained from historical weather reports, including information describing the location of hail events, the date and time of the events, and the size of hail recorded during those events. For example, the historical weather report data may be obtained from a data source 120 associated with a government or scientific agency that monitors and records weather events, including hail. In some implementations, the hail size modeler 402 may extract and clean data from data sources to obtain the hail size data used to train one or more models. For example, in some implementations, the hail size modeler 402 may determine a latitude and longitude associated with a location described in a hail report and extract the size of hail reported and convert the size, if needed, into a common unit (e.g., into either inches or centimeters). Depending on the implementation, the hail size modeler 402 may determine the latitude and longitude passively, e.g., by receiving a latitude and longitude in the report, or actively, e.g., by converting a location represented by another geographic coordinate system (e.g., a Universal Transverse Mercator based coordinate system) or a street address into a latitude and longitude.

The hail size modeler 402 trains one or more hail size models to predict hail size. The varieties of supervised, semi-supervised, unsupervised, reinforcement learning, topic modeling, dimensionality reduction, meta-learning, and deep learning machine learning algorithms, which may be used to generate the one or models to predict hail size are so numerous as to defy a complete list. Examples of algorithms include, but are not limited to, a decision tree; a gradient-boosted tree, a gradient-boosted machine; boosted stumps; a random forest; a support vector machine; a neural network (e.g., convolutional and/or recurrent); logistic regression (with regularization), linear regression (with regularization); stacking; a Markov model; support vector machines; and others.

In some implementations, the hail size modeler 402 trains a Gaussian process regression model that takes a location (e.g., in the form of a latitude and longitude) as an input and outputs a hail size (e.g., an average hail size and/or a maximum hail size depending on the implementation). However, it should be recognized that the disclosure herein is not limited to implementations using a Gaussian process regression model, and other artificial intelligence or machine learning algorithms may be used. For example, while a regression model may output a continuous value (e.g., the size of an average hail stone in cm), some implementations may bin hail stone size and use a classifier, thereby outputting a class of hail stone size. Examples of classes may include, by way of example, and not limitation small/medium/large, non-damaging/minor damaging/damaging/severely damaging since the size of the hail stone may correlate with its potential to cause damage or others. It should be recognized that the number of classes, their names, etc., may vary without departing from the disclosure herein.

In some implementations, the hail size modeler 402 retrains one or more hail size models. For example, the hail size modeler 402 may retrain annually to incorporate the preceding year's hail size data in some implementations. In some implementations, batch, mini-batch, or online training may be performed as new hail size data becomes available. In some implementations, the hail size modeler 402 may retrain to maintain a rolling window of a predetermined number of preceding years (e.g., 5, 10, 20, or 50 years) to discount stale data and more closely track more recent weather phenomena.

In some implementations, the hail size modeler 402 validates one or more hail size models trained. For example, in some implementations, the hail size modeler 402 may hold out data for a year (or another period) from the hail size data when training and comparing that held-out portion of the hail size data to the output of one or more hail size models to confirm the accuracy of the one or more hail size models.

In some implementations, the hail size modeler 402, when put into production, receives a location (e.g., in latitude and longitude or converted, by the hail size modeler 402, into latitude and longitude) and outputs a predicted hail size or category of hail size. The hail size modeler 402 is communicatively coupled to other components of one or more of the climatology modeler 302, the hail predictor 220, or components thereof. For example, in some implementations, the hail size modeler 402 is communicatively coupled to send to, or store for retrieval by, one or more of the damage frequency modeler 304 and the damage severity modeler 306, the predicted hail size(s) and/or category(ies) thereof.

The hail frequency modeler 404 obtains hail frequency data, trains, validates one or more hail frequency models based on the hail frequency data, and generates one or more predictions regarding hail frequency. The hail frequency modeler 404 obtains hail frequency data. In some implementations, at least a portion of the hail frequency data is obtained from the same data set as the hail size data. For example, the hail frequency modeler 404 obtains the hail frequency data from historical weather reports, including information describing the location of hail events, the date and time of the events, and the size of hail recorded during those events. In some implementations, the hail frequency modeler 404 may extract and clean data from data sources to obtain the hail frequency data used to train one or more hail frequency models. For example, in some implementations, the hail size modeler 402 may determine a latitude and longitude associated with a location described in a hail report and extract the timing (e.g., time and date) of the event.

In some implementations, the hail frequency modeler 404 validates one or more hail frequency models trained. For example, in some implementations, the hail frequency modeler 404 may hold out data for a particular year (or another period) from the hail data when training and comparing that held-out portion of the hail data to the output of one or more hail frequency models to confirm the accuracy of the one or more hail frequency models.

Depending on the implementation, the hail frequency modeler 404 may model and predict an absolute frequency of hail, i.e., a probability of any hail, a hail "of interest" frequency, i.e., a probability of a hail event with hail above some minimum size threshold (e.g., a minimum size to cause damage to a roof and/or vehicle), or a combination thereof. In some implementations, the hail frequency modeler 404 may predict the frequency of hail above (or below) a certain size.

In some implementations, the hail frequency modeler 404, when put into production, receives a location (e.g., in latitude and longitude or converted to latitude and longitude) and outputs a predicted hail frequency or category thereof. The hail frequency modeler 404 is communicatively coupled to other components of one or more of the climatology modeler 302, the hail predictor 220, or components thereof. For example, in some implementations, the hail frequency modeler 404 is communicatively coupled to send to, or store for retrieval by, one or more of the damage frequency modeler 304 and the damage severity modeler 306, the predicted hail frequency(ies) and/or category(ies) thereof.

In some implementations, the hail frequency modeler 404 uses feature data describing specific attributes, or features, associated with a property to train the hail frequency model(s) and predict a hail frequency associated with a received location.

Figure 5:
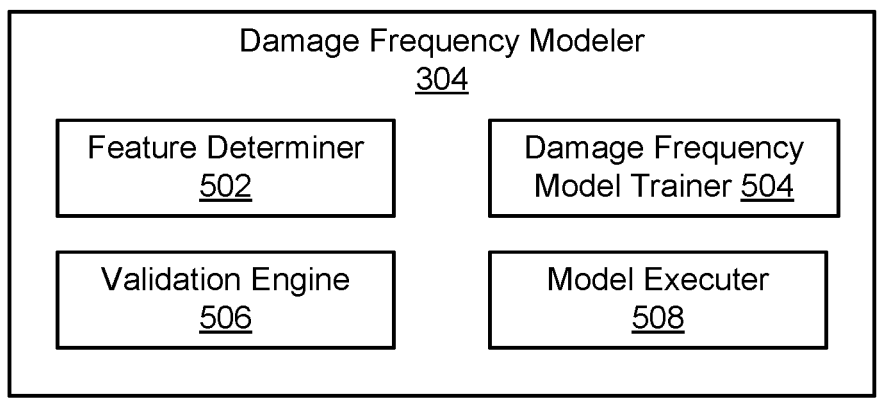
FIG. 5 is a block diagram of an example claim frequency modeler in accordance with some implementations.

In FIG. 5, a block diagram of an example damage frequency modeler 304 is illustrated in accordance with some implementations. In the illustrated implementation of FIG. 5, the damage frequency modeler 304 includes a feature determiner 502, a damage frequency model trainer 504, a validation engine 506, and a model executer 508.

The feature determiner 502 obtains feature data describing one or more features of one or more locations. The feature data describing one or more features of one or more locations obtained by the feature determiner 502 may be used during the validation and training of one or more feature models (e.g., by the damage frequency model trainer 504 and validation engine 506, respectively). The feature data describing one or more features of one or more locations obtained by the feature determiner 502 may be used during runtime to predict a damage frequency (e.g., by model executer 508).

The feature data and features represented by the feature data may vary depending on the implementation. Examples of features may include, but are not limited to, a building area, a vegetation density, a roof material, a roof quality, a roof pitch, a roof height, a presence and/or portion of skylights, a presence and/or a portion of the roof comprising of solar panels, a number of roof facets, a roof shape, a land cover code, a temperature, a precipitation type or metric, an elevation, a hail frequency, a hail size, etc. However, it should be recognized that other and different features, as well as combinations and permutations thereof, are contemplated and within this disclosure.

The building area feature data may represent the footprint of a structure or its roof, e.g., as measured in square feet or square meters.

The vegetation density feature data may, in some implementations, represent one or more of a portion of a structure (or its roof) shielded by overhanging vegetation and a portion of a surrounding area that includes vegetation. For example, a portion of an area within X feet of the perimeter of a structure's roofline to determine a portion of vegetation "near," i.e., within the X feet of the structure and/or overhanging the structure. The threshold may vary depending on the implementation and use case, e.g., X may be 5, 10, 20, 30, 40, 50, or other values. The threshold may also be measured in different units, such as meters, depending on the implementation. Depending on the implementation, the vegetation density may be continuous (e.g., a percentage) or discrete (e.g., bins having a range of density percentages or categories such as none/low/medium/high).

The roof material feature data may, in some implementations, represent the type or material composition of a roof covering. In some implementations, the roof material, or "type," may include, by way of example and not limitation, composite shingle, tile, slate, metal, flat roof material, wood, mixed, or other. Other and different materials and categorizations, including more or fewer, are contemplated and may be used without departing from the disclosure herein.

A roof quality feature data may, in some implementations, represent the condition of a structure's roof. In some implementations, the roof condition may include conditions including, but not limited to, one or more of new, good, light wear, heavy wear, minor damage, major damage, and unknown. However, other and different roof conditions, including using more or fewer, are contemplated and may be used without departing from the disclosure herein.

The roof pitch feature data may, in some implementations, represent the pitch of a structure's roof. For example, the maximum, minimum, or average pitch of the roof. The presence and/or portion of skylights feature data may, in some implementations, represent whether the roof includes one or more skylights and if so, a portion of the roof comprising skylights. The presence and/or portion of a roof comprising solar panels feature data may, in some implementations, represent whether a roof includes one or more solar panels and if so, a portion of the roof comprising solar panels. In some implementations, a number of roof facets feature data may represent a number of roof facets for a structure.

The roof shape feature data may, in some implementations, represent a shape of a structure's roof. Examples of roof shapes may include, but are not limited to, hip, gable, Dutch, mansard, flat, shed, butterfly, gambrel, dormer, M-shaped, cross-hipped, intersecting/overlaid hip, hip, and valley, hexagonal, etc. However, more, fewer, or different roof shapes may be used without departing from the disclosure herein.

The land cover code feature data may, in some implementations, represent a type of land cover at a location (e.g., high-density urban, suburban, rural, etc.). The temperature feature data may, in some implementations, represent one or more of a minimum, maximum, or average temperature, e.g., annually and/or during a hail season. The precipitation feature data may, in some implementations, represent one or more types of precipitation (e.g., rain, snow, hail, etc.) and/or one or more metrics (e.g., a minimum, maximum, or average precipitation) and may describe different time periods (e.g., annually and/or during a season associated with the type or precipitation). The elevation feature data may, in some implementations, represent one or more of an elevation above sea level and a roof elevation (min., max., or average) above grade. The hail frequency feature data may, in some implementations, represent a probability of an occurrence of hail, e.g., one or more of the probability of hail occurring (at all) and the probability of hail that has the potential to cause damage (e.g., above a threshold size of hail stone) occurring. The hail size feature data may, in some implementations, represent characteristics of hail at a location, e.g., one or more of average hail size and a maximum hail size.

Figure 6:
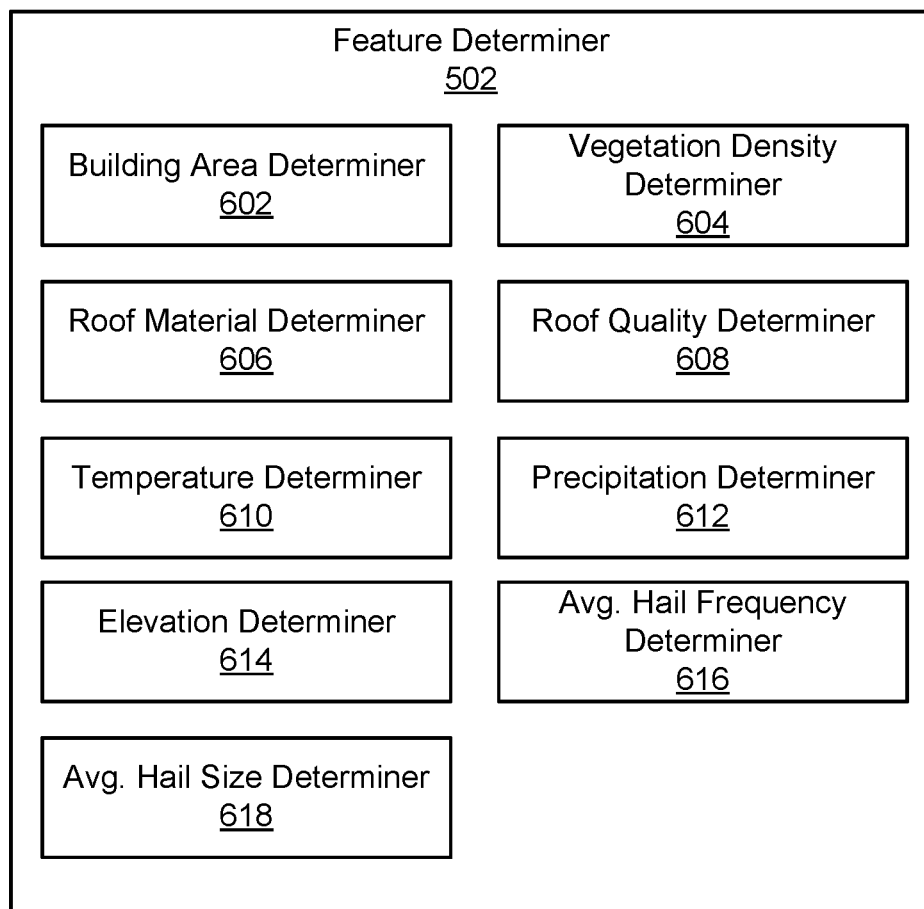
FIG. 6 is a block diagram of an example feature determiner in accordance with some implementations.

Referring now to FIG. 6, an example feature determiner 502 is illustrated according to one implementation. In the illustrated implementation of FIG. 6, the feature determiner 502 includes a building area determiner 602, a vegetation density determiner 604, a roof material determiner 606, a roof quality determiner 608, a temperature determiner 610, a precipitation determiner 612, an elevation determiner 614, an average hail frequency determiner 616, and an average hail size determiner 618. In some implementations, the subcomponents 602/604/606/608/610/612/614/616 of the feature determiner 502 each obtain its respectively identified feature data. For example, the building area determiner 602 obtains building area feature data. The vegetation density determiner 604 obtains vegetation density feature information, the roof material determiner 606 obtains a roof material for a structure at the location, the roof quality determiner 608 obtains the quality of the roof of a structure at the location, and so forth.

Depending on the implementation and use case, the mechanism by which the feature determiner 502 or subcomponent 602/604/606/608/610/612/614/616 thereof obtains the feature data may vary. In some implementations, the feature determiner 502 or subcomponent(s) 602/604/606/608/610/612/614/616 thereof obtain the feature data "passively", i.e., the feature determiner 502 does not actively generate, calculate, or determine the feature data but receives or reads the data. For example, feature data may be received or read from a data source 120. For example, one or more of a building's square footage, a vegetation density, a roof material, a roof quality, an elevation (e.g., the height of the roof above grade) may be obtained passively (e.g., by the building area determiner 602, the vegetation density determiner 604, roof material determiner 606, roof quality determiner 608, and elevation determiner 614, respectively) from records such as county building records, or records generated from human inspection and/or measurement. As another example, one or more of the temperature, precipitation type or metric, and elevation (above sea level) may be obtained passively (e.g., by the temperature determiner 610, precipitation determiner 612, and elevation determiner 614, respectively) from weather and/or geographic survey data. As another example, the average hail frequency determiner 616 is communicatively coupled to receive or retrieve, the average hail frequency determined by the hail frequency modeler 404, and the average hail size determiner 618 is communicatively coupled to receive, or retrieve, the average hail size determined by the hail size modeler 402.

In some implementations, the feature determiner 502 or subcomponent(s) 602/604/606/608/610/612/614/616 thereof obtain the feature data "actively," i.e., the feature determiner 502 generates, calculates, or determines the feature data. For example, the average hail frequency determiner 616 includes an instance of the hail frequency modeler 404 and the average hail size determiner 618 includes an instance of the hail size modeler 402. As another example, one or more of: the building area determiner 602 obtains an aerial image of the location and uses a building area model to determine the building (or roof) area; the vegetation density determiner 604 obtains an aerial image of the location and uses a vegetation density model to determine the vegetation density; the roof material determiner 606 obtains an aerial image of the location and uses a roof material determination model to determine a roof material;

and the roof quality determiner 608 obtains an aerial image of the location and uses a roof quality model to determine a roof quality.

In some implementations, one or more of the building area determiner 602, vegetation density determiner 604, roof material determiner 606, and the roof quality determiner 608 use machine learning models applied to and trained on, one or more aerial images (e.g., RGB aerial or satellite images, DSM images, etc.). The varieties of supervised, semi-supervised, unsupervised, reinforcement learning, topic modeling, dimensionality reduction, meta-learning and deep learning machine learning algorithms, which may be used to generate those models, are so numerous as to defy a complete list. Examples of algorithms include, but are not limited to, a decision tree; a gradient-boosted tree, gradient-boosted machine; boosted stumps; a random forest; a support vector machine; a neural network (e.g., convolutional and/or recurrent); logistic regression (with regularization), linear regression (with regularization); stacking; a Markov model; support vector machines; and others. In some implementations, the building area determiner 602, vegetation density determiner 604, roof material determiner 606, and the roof quality determiner 608 use machine learning models applied to, and trained on, one or more aerial images (e.g., RGB aerial or satellite images, DSM images, etc.).

During training, the feature determiner 502 obtains feature data describing one or more features for various properties included in the training data. During runtime, the feature determiner 502 obtains feature data describing one or more features of a property, or structure, at a received location. For example, the feature determiner 502 receives a location, such as an address of interest or a latitude and longitude, and obtains feature data describing one or more features of a structure at the location, such as a building (or roof) area, vegetation density, roof material, roof quality, temperature, precipitation type or metric, elevation, average hail frequency, average hails size, etc. at the requested location. In some implementations, the feature determiner 502, or one or more subcomponents, obtain one or more aerial images (e.g., DSM and RGB images) and derive data describing one or more features by applying one or more models (e.g., one or more convolutional neural networks) to the one or more images).

The feature determiner 502 and its subcomponents are communicatively coupled to other components of one or more of the damage frequency modeler 304, the hail predictor 220, or components thereof. For example, in some implementations, the feature determiner 502 is communicatively coupled to send to, or store for retrieval by, one or more of the damage frequency model trainer 504 and validation engine 506, the feature data for training and validation. As another example, in some implementations, during runtime, the feature determiner 502 is communicatively coupled to send to, or store for retrieval by, the model executer 508, the feature data for the application of the damage frequency model.

Referring again to FIG. 5, the damage frequency model trainer 504 trains one or more damage frequency models. The varieties of supervised, semi-supervised, unsupervised, reinforcement learning, topic modeling, dimensionality reduction, meta-learning and deep learning machine learning algorithms, which may be used to generate the one or models to predict hail frequency, are so numerous as to defy a complete list. Examples of algorithms include, but are not limited to, a decision tree; a gradient-boosted tree, gradient-boosted machine; boosted stumps; a random forest; a support vector machine; a neural network; logistic regression (with regularization), linear regression (with regularization); stacking; a Markov model; support vector machines; and others.

In some implementations, the damage frequency model trainer 504 trains a Gaussian process regression model that takes a location (e.g., in the form of latitude and longitude) as an input and outputs a frequency or probability of a hail event occurring at that location. However, it should be recognized that the disclosure herein is not limited to implementations using a Gaussian process regression model and other artificial intelligence or machine learning algorithms may be used. For example, while a regression model may output a continuous value (e.g., the frequency of hail events or probability of a hail event occurring within a particular time period), some implementations may bin the frequency (e.g., "claim" if the probability of a hail claim occurring is >50% else "no claim") or use a classifier, thereby outputting a class of hail frequency. Examples of classes may include, by way of example and not limitation, high/medium/low, no hail/low frequency/moderate frequency/high frequency/very high frequency, claim/no claim, etc. It should be recognized that the number of classes, their names, etc., may vary without departing from the disclosure herein.

In some implementations, damage frequency model trainer 504 retrains one or more hail frequency models. For example, the damage frequency model trainer 504 may retrain annually to incorporate the preceding year's hail data in some implementations. In some implementations, batch, mini-batch, or online training may be performed as new hail data becomes available. In some implementations, the damage frequency model trainer 504 may retrain to maintain a rolling window of a predetermined number of preceding years (e.g., 5, 10, 20, or 50 years) to discount stale data and more closely track more recent weather phenomena.

The damage frequency model trainer 504 uses training data to train one or more hail frequency models. In some implementations, the damage frequency model trainer 504 prepares the training data, which includes data describing properties that experienced hail damage and properties that did not experience hail damage. For example, in some implementations, the damage frequency model trainer 504 identifies the first set of properties that experienced hail damage from one or more of insurance claim information (e.g., hail claims) and/or building permit data (e.g., building permits for roof repair and/or replacement where the permit indicates hail as a cause or contributory reason). For example, in some implementations, the damage frequency model trainer 504 identifies a second set of properties that did not experience hail damage from one or more of from insurance claim information (e.g., non-hail claims), properties in areas where hail is uncommon (e.g., Utah, Idaho, etc.), and randomly selected properties. Note that hail is relatively rare, and hail damage claims are even rarer. Therefore, in some implementations, a randomly selected location may be used as a "no hail" or "no claim" (depending on the use case) instance in the training data and may, in some instances, prevent issues associated with training on smaller data sets (e.g., overfitting).

In some implementations, the damage frequency model trainer 504 may obtain the locations and feature data (e.g., via the feature determiner 502) for each property in the training data set to generate the training data on which one or more damage frequency models. In some implementations, further filtering and cleaning of the training data may be done by the damage frequency model trainer 504, e.g., to eliminate a type or limit a type of structure (e.g., eliminate buildings under construction, or non-single-family homes, or properties that satisfy a threshold). Examples of such thresholds may include, but are not limited to, roof sizes that exceed a maximum threshold or do not meet a minimum threshold, etc.

The validation engine 506 validates one or more damage frequency models trained. For example, in some implementations, the validation engine 506 may hold out data for a particular area (e.g., a city, state, or region) when training and comparing that held-out portion of the hail data to the output of one or more damage frequency models to confirm the accuracy of the one or more models. As another example, in some implementations, the validation engine 506 may hold out data for a particular year (or another period of time) when training and comparing that held-out portion to the output of one or more damage frequency models to confirm the accuracy of the one or more models.

In some implementations, the damage frequency model trainer 504 and validation engine 506 may perform feature selection. In some implementations, during feature selection, different features or sets of features may be eliminated, and a performance of the resulting (e.g., trained and validated) model instances may be compared to one another (e.g., by comparing F1 scores or other performance metric (s)). Based on a performance comparison, in some implementations, a model with a reduced feature set may perform better, as well, or nearly as well as a model with a larger feature set. In some implementations, the model with the reduced feature set is selected for application by the model executor 508.

The model executer 508 applies one or more damage frequency models and presents a resulting damage frequency. For example, during runtime, the model executer 508 receives a location, obtains feature data associated with the received location from the feature determiner 502, and applies one or more damage frequency models. In some implementations, the feature data includes data describing one or more of: one or more weather features (e.g., an average hail size, hail frequency, average amount of annual hail precipitation, average temperature, etc.) and one or more features of a property at the location (e.g., any of the aforementioned property and/or structural features, such as roof size, roof material, roof shape, roof condition, vegetation density, etc.).

The model executer 508 is communicatively coupled to send, or store for retrieval, the damage frequency. For example, in some implementations, the model executer 508 may be coupled to one or more of the damage severity modeler 306 and the decision engine 308. In another example, the model executer 508 is communicatively coupled to present the damage frequency (e.g., display the damage frequency associated with the received location).

Referring again to FIG. 3, the damage severity modeler 306 trains, validates, and applies one or more damage severity models. In some implementations, during training, the damage severity modeler 306 uses training data describing a plurality of properties that experienced hail damage. Depending on the implementation, the plurality of properties that experienced hail damages may be obtained from one or more of the claims data, including properties that submitted a claim for hail damage and building permit data where permits (e.g., for roof repair or replacement) identify hail as the cause or contributory reason.

In some implementations, the training data used by the damage severity modeler 306 includes, for each described property that experienced damage, one or more damage values associated with the property that experienced hail damage, one or more weather features associated with the property that experienced hail damage, and one or more specific attributes, or features, associated with the property, or a structure on the property. Examples of damage values may include but are not limited to a number of roof squares (e.g., damaged, replaced, claimed, etc.), a square footage (e.g., damaged, replaced, claimed, etc.), a replacement cost, etc. In some implementations, a roof square is 10 square feet. Examples of weather features associated with a property include one or more of a temperature, a precipitation type (e.g., hail) or a measure (e.g., number of inches or occurrences annually), an elevation, a hail frequency, a hail size, etc. Examples of specific attributes, or features, associated with the property, or a structure on the property, may include, but are not limited to, one or more of a building (or roof) area, a vegetation density, a roof material, a roof quality, a roof pitch, a roof height, a presence and/or a portion of skylights, a presence and/or a portion of a roof comprising solar panels, a number of roof facets, a roof shape, a land cover code, an elevation.

Depending on the implementation, the features represented in training data for the damage frequency model and the damage severity model may vary in their degree of similarity. For example, the training data for the damage frequency model and the damage severity model may or may not be mutually exclusive. In implementations where the training data for the damage frequency model and the damage severity model are not mutually exclusive, their degree of similarity may vary, depending on the implementation and use case, in the number of damage values and/or weather features and/or property features commonly represented in both sets of training data.

In some implementations, the damage severity modeler 306 may include a feature determiner for obtaining feature data including, e.g., one or more of at least one damage value, at least one weather feature, and at least one feature during training and/or runtime. In some implementations, the damage severity modeler 306 may include a feature determiner analogous to feature determiner 502, discussed above with reference to FIG. 6, or analogous to one or more components of feature determiner 502. In some implementations, the damage severity modeler 306 may be communicatively coupled to and use a feature determiner 502 or one or more subcomponents thereof.

In some implementations, one or more features are encoded. For example, roof materials composite shingle, tile, slate, metal, flat roof material, wood, mixed, and others may be encoded as 0, 1, 2, 3, 4, 5, 6, and 7, respectively. As another example, the roof shapes hip, hip-gable, gable, flat, and other may be encoded as 0, 1, 2, 3, and 4, respectively. As another example, solar panels=yes and solar panels=no may be encoded as 0 and 1, respectively. As yet another example, the roof qualities of good, light wear, heavy wear, minor damage, major damage, and bad image may be encoded as 0, 1, 2, 3, 4, and NaN, respectively. It should be recognized that these are merely examples of encodings and categories that are encoded, and variations are contemplated and within the scope of this disclosure.

Depending on the implementation and use case, a damage value may be a raw value (e.g., a number of roof squares, such as 4.3) or a binned range of roof squares (e.g., 4-6 roof squares). The number of bins and associated ranges may vary depending on the implementation and use case.

The damage severity modeler 306 trains one or more damage severity models. The varieties of supervised, semi-supervised, unsupervised, reinforcement learning, topic modeling, dimensionality reduction, meta-learning and deep learning machine learning algorithms, which may be used to generate the one or models to predict hail frequency, are so numerous as to defy a complete list. Examples of algorithms include, but are not limited to, a decision tree; a gradient-boosted tree, gradient-boosted machine; boosted stumps; a random forest; a support vector machine; a neural network; logistic regression (with regularization), linear regression (with regularization); stacking; a Markov model; support vector machines; and others.

Depending on the implementation and use case, it may be preferable to have the damage severity output as a continuous variable (e.g., roof squares, expected loss, etc.) or as a discrete variable (e.g., a plurality of bins associated with different ranges of roof squares) or a classifier (high/medium/low). It should be recognized that other numbers of classes, class names, bins, and associated ranges, etc., are contemplated and may be used without departing from the disclosure herein. For clarity and convenience, a regression (continuous variable output) implementation and a classifier (discrete variable output) implementation are discussed with reference to FIG. 7.

Figure 7:
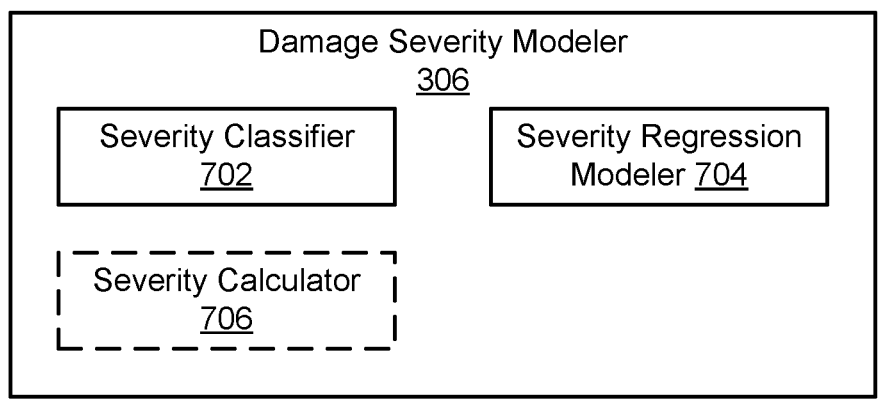
FIG. 7 is a block diagram of a claim severity modeler in accordance with some implementations.

Referring now to FIG. 7, a block diagram of an example damage severity modeler 306 is illustrated in accordance with some implementations. In the illustrated implementation of FIG. 7, the damage severity modeler 306 includes a severity classifier 702, a severity regression modeler 704, and a severity calculator 706. In some implementations, the severity calculator 706 is optional and may be omitted.

The severity classifier 702 trains, validates, and tests one or more damage severity classification models. The classification algorithm used by the severity classifier 702 may vary based on the implementation and use case. In some implementations, the severity classifier 702 uses a gradient-boosted machines algorithm. In some implementations, the severity classifier 702 performs an 80/20 split (i.e., it uses 80% of data available for training and 20% for validation). In some implementations, the severity classifier 702 performs an optimization using Bayesian optimization, but other optimizations may be used.

The severity regression modeler 704 trains, validates, and tests one or more damage severity regression models. The regression algorithm used by the severity regression modeler 704 may vary based on the implementation and use case. In some implementations, the severity regression modeler 704 uses a gradient-boosted machine algorithm. In some implementations, the regression modeler 704 performs an 80/20 split (i.e., uses 80% of data available for training and 20% for validation). In some implementations, the severity regression modeler 704 determines an information gain associated with each feature used in the model.

In some implementations, one or more features may be eliminated from a damage model. For example, one or more of a feature with a gain below a threshold or a feature outside the X features with the highest gain may be eliminated. Such feature reduction may beneficially expedite training and execution of the associated model while minimizing adverse effects on accuracy.

In some implementations, damage severity modeler 306 retrains one or more damage severity models. For example, the damage severity modeler 306 may retrain annually to incorporate the preceding year's hail data in some implementations. In some implementations, batch, mini-batch, or online training may be performed as new data becomes available. In some implementations, the damage severity modeler 306 may retrain to maintain a rolling window of a predetermined number of preceding years (e.g., 5, 10, 20, or 50 years) to discount stale data and more closely track more recent weather phenomena.

In some implementations, the damage severity modeler 306 may obtain the locations and feature data (e.g., via the feature determiner 502) for each property in the training data set to generate the training data on which one or more damage severity models. In some implementations, further filtering and cleaning of the training data may be done by the damage frequency model trainer 504, e.g., to eliminate a type or limit a type of structure (e.g., eliminate buildings under construction, or non-single-family homes, or properties that satisfy a threshold). Examples of such thresholds may include, but are not limited to, roof sizes that exceed a maximum threshold or do not meet a minimum threshold, etc.

The damage severity modeler 306 validates one or more damage severity models trained. For example, in some implementations, the damage severity modeler 306 may hold out data for a particular area (e.g., a city, state, or region) from the hail data when training and comparing that held-out portion of the hail data to the output of one or more hail size models to confirm the accuracy of the one or more models. As another example, in some implementations, the damage severity modeler 306 may hold out data for a particular year (or another period of time) from the hail data when training and comparing that held-out portion of the hail data to the output of one or more hail damage severity models to confirm the accuracy of the one or more models.

The damage severity modeler 306 applies one or more damage severity models and presents a resulting damage severity. For example, during runtime, the damage severity modeler 306 receives a location, obtains feature data associated with the received location, and applies one or more damage severity models. In some implementations, the feature data includes data describing one or more of: one or more weather features (e.g., an average hail size, hail frequency, precipitation type or metric, average temperature, etc.) and one or more features of a property at the location (e.g., any of the aforementioned property and/or structural features, such as roof size, roof material, roof shape, roof condition, vegetation density, etc.).

The damage severity modeler 306 is communicatively coupled to send or store for retrieval, the damage severity. For example, in some implementations, the damage severity modeler 306 may be coupled to one or more of the damage frequency modeler 304 and the decision engine 308. In another example, the damage severity modeler 306 is communicatively coupled to present the damage frequency (e.g., display the damage frequency associated with the received location).

The severity calculator 706 may perform one or more calculations based on an output from the severity classifier 702 and/or regression modeler 704. For example, the severity calculator 706 may obtain the damage severity from the damage severity modeler 306, perform one or more calculations, and present the results. For example, in some implementations, the severity modeler 306 outputs the damage severity as a number of roof squares expected to be damaged and/or claimed. The severity calculator 706 may perform calculations based on that output, such as the cost of replacement, expected loss, estimated quantity of materials, estimated labor charges, estimated delivery fees, estimated labor costs, and annual average work value, which may account for inflation, etc.

Example Methods

Figure 8:
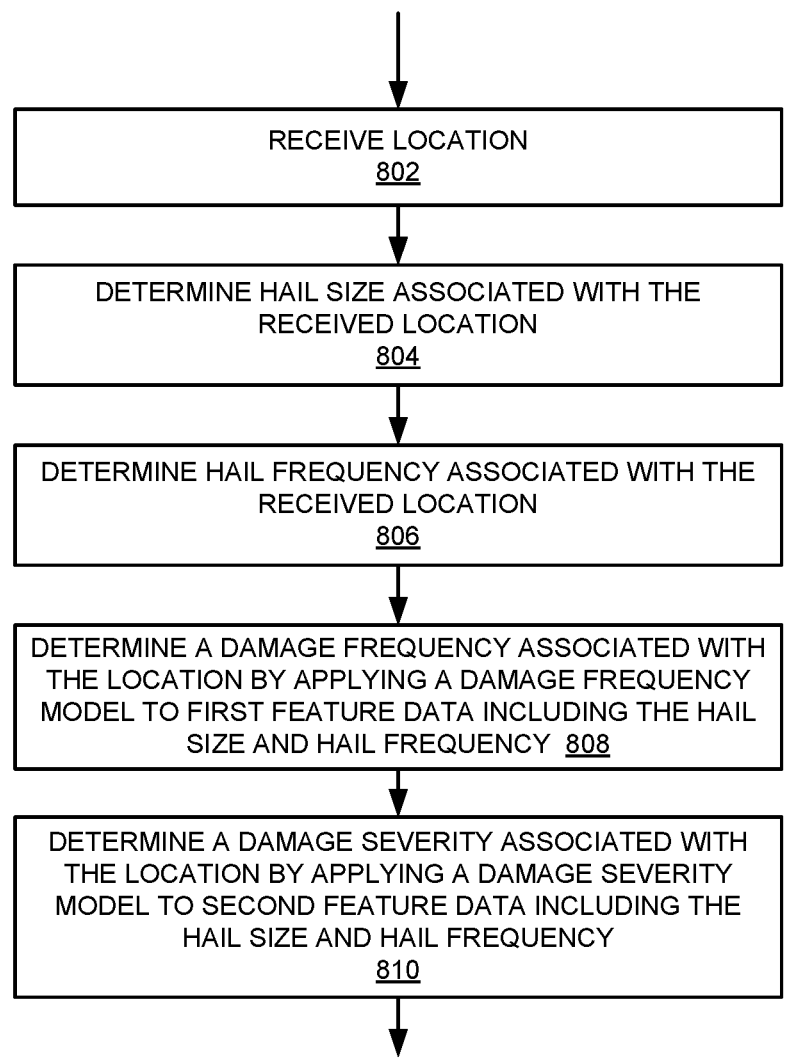
FIG. 8 is a flowchart of an example method for making one or more hail predictions in accordance with some implementations.
Figure 9:
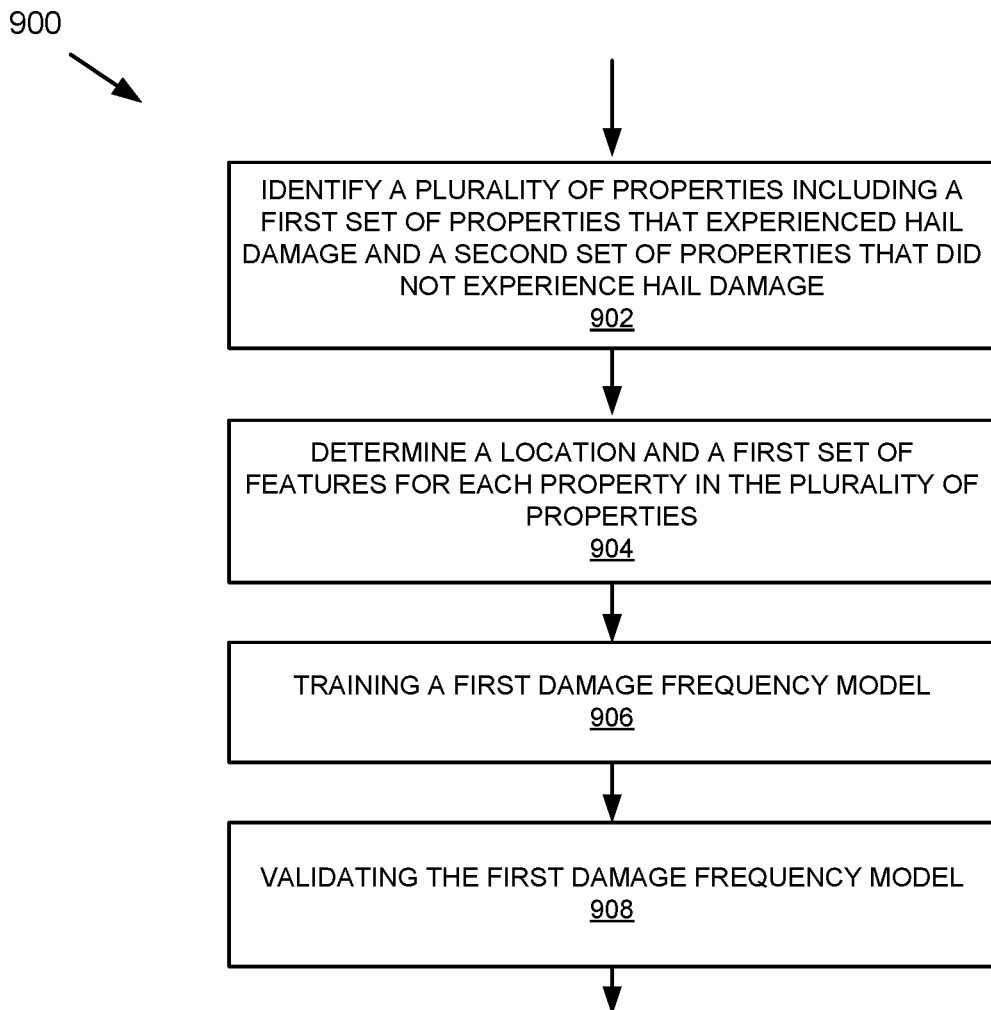
FIG. 9 is a flowchart of an example method for training frequency of damage model(s) in accordance with some implementations.
Figure 10:
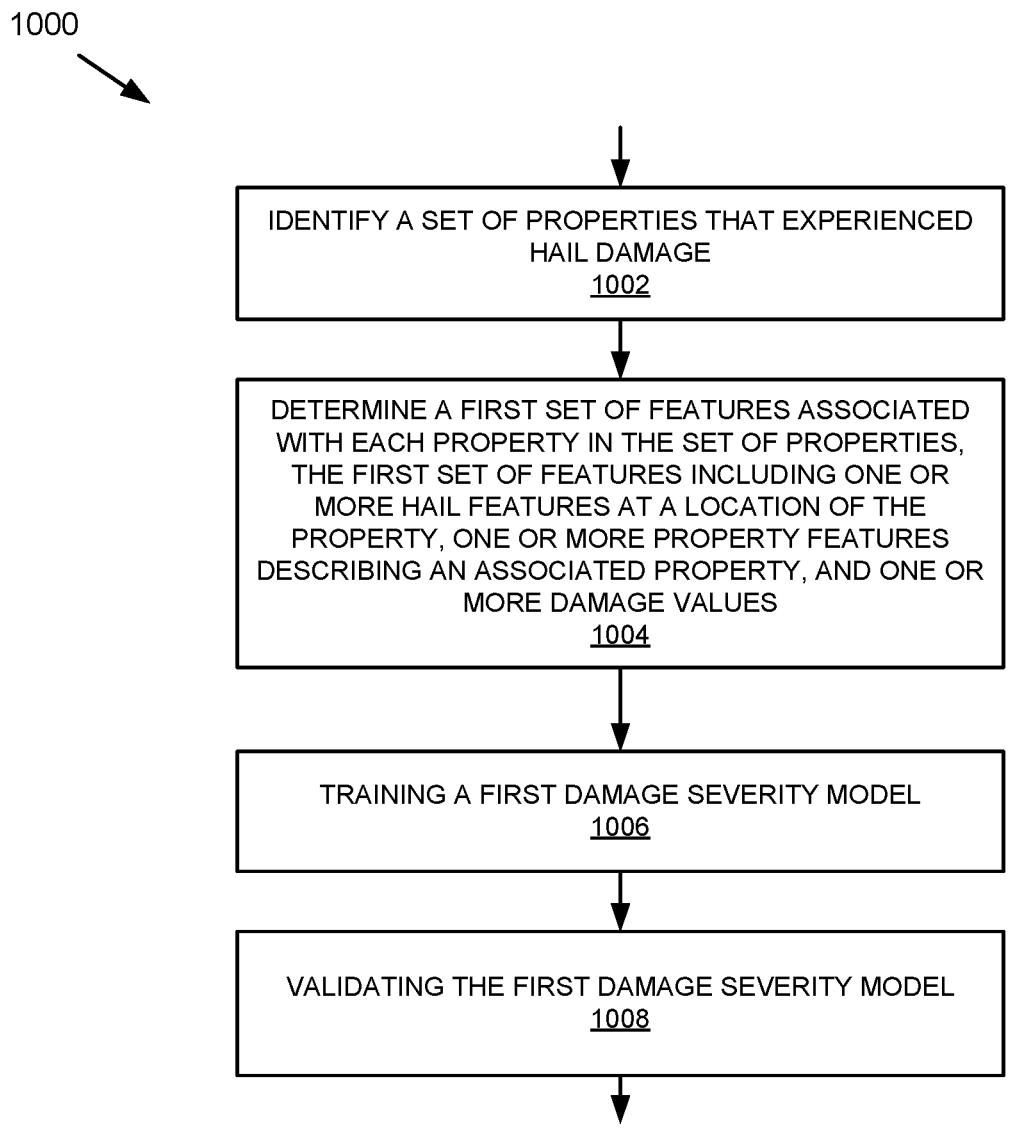
FIG. 10 is a flowchart of an example method for training a damage severity model in accordance with some implementations.

FIGS. 8-10 are flowcharts of example methods that may, in accordance with some implementations, be performed by the systems described above with reference to FIGS. 1-7. The methods of FIGS. 8-10 are provided for illustrative purposes, and it should be understood that many variations exist and are within the scope of the disclosure herein.

FIG. 8 is a flowchart of an example method 800 for making one or more hail predictions in accordance with some implementations. At block 802, the hail predictor 220 receives a location. At block 804, the climatology modeler 302 determines a hail size associated with the location using a first hail machine learning model. At block 806, the climatology modeler 302 determines a hail frequency associated with the location using a first hail frequency machine learning model. At block 808, the damage frequency modeler 304 determines a damage frequency associated with the location by applying a first damage frequency machine learning model to the first feature data, including the hail size and hail frequency. At block 810, the damage severity modeler 306 determines a damage severity associated with the location by applying a first damage severity machine learning model to second feature data, including the hail size and hail frequency.

FIG. 9 is a flowchart of an example method 900 for training frequency of damage model(s) in accordance with some implementations. At block 902, the damage frequency modeler 304 identifies a plurality of properties, including a first set of properties that experienced hail damage and a second set of properties that did not experience hail damage. At block 904, the feature determiner 502 determines a location and the first set of features for each property in the plurality of properties. At block 906, the damage frequency model trainer 504 trains a first damage frequency model. At block 908, the validation engine 506 validates the first damage frequency model.

FIG. 10 is a flowchart of an example method 1000 for training a damage severity model in accordance with some implementations. At block 1002, the damage severity modeler 306 identifies a set of properties that experienced hail damage. At block 1004, the damage severity modeler 306 determines the first set of features associated with each property in the set of properties, the first set of features including one or more hail features at a location of the property, one or more property features describing an associated property, and one or more damage values. At block 1006, the damage severity modeler 306 trains a first damage severity model. At block 1008, the damage severity modeler 306 validates the first damage severity model.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk, including floppy disks, optical disks, CD-ROMs, magnetic optical disks, read-only memories (ROMs), random access memories (RAMs), EPROMs, EEPROMs, magnetic or optical cards, or any type of media suitable for storing electronic instructions, each coupled to a computer system bus.

The disclosure can take the form of an entirely hardware implementation, an entirely software implementation, or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, a magnetic tape, a removable computer diskette, a random-access memory (RAM), a read-only memory (ROM), a flash memory, a rigid magnetic disk, and an optical disk. Current examples of optical disks include compact disk—read-only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during the actual execution of the program code, bulk storage, and cache memories which provide temporary storage of at least some program code in order to reduce the number of times code must be retrieved from bulk storage during execution. For determining climate risk using artificial intelligence. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is described with reference to a particular programming language. It will be appreciated that a variety of programming languages may be used to implement the teachings of the disclosure as described herein.

What is claimed is:

1. A computer implemented method comprising:
    determining, using one or more processors, a set of training data for training a first damage severity model including:
        identifying a set of properties that experienced hail damage, the set of training data for the first damage severity model including the identified set of properties that experienced hail damage;
        determining a first set of features associated with each property in the set of properties, the first set of features including one or more hail features at a location of the property, one or more property features describing an associated property, and one or more damage values;
        determining a gain associated with each feature in the first set of features; and
        determining a first subset of features from the first set of features by eliminating a second subset of features within the first set of features from the first set of training data for the first damage severity model, based on a gain threshold, wherein the first subset of features are associated with sufficient gain values to satisfy the gain threshold and the second subset of features are associated with insufficient gain values to satisfy the gain threshold;
    training, using the one or more processors, the first damage severity model based on the set of training data for the first damage severity model; and
    validating, using the one or more processors, the first damage severity model.

2. The computer implemented method of claim 1 further comprising:
    receiving a location;
    applying the first damage severity model; and
    presenting a damage severity.

3. The computer implemented method of claim 2, wherein the damage severity is one or more of: a roof area damaged, a claim cost, and a cost of replacement.

4. The computer implemented method of claim 2 further comprising:
    determining, based on a determined damage severity, one or more of: a remedial action to reduce a risk of hail; whether to approve or deny hail insurance coverage or an insurance claim; an insurance premium associated with the location, an adjustment to an insurance premium associated with location; and to warn one or more of a property owner, resident, financier and insurer associated with the location of a risk of damage posed by hail.

5. The computer implemented method of claim 1, wherein the set of properties that experienced hail damage includes one or more of a first property from hail claims data and a second property from building permit data, where a building permit associated with the second property indicates hail.

6. The computer implemented method of claim 1, wherein identifying the set of properties that experienced hail damage comprises:
    obtaining an initial set of properties that experienced hail damage;
    eliminating, from the initial set of properties, properties unassociated with a damage value;
    eliminating, from the initial set of properties, one or more properties under construction; and
    identifying, as the set of properties that experienced hail damage, a remaining set of properties.

7. The computer implemented method of claim 6, wherein a threshold is associated with one or more of a maximum roof size, a minimum roof size, a maximum damage value, a minimum damage value, and an outlier.

8. The computer implemented method of claim 1, wherein the first damage severity model is a regression model.

9. The computer implemented method of claim 1, wherein the first damage severity model is a classifier.

10. The computer implemented method of claim 1, wherein the first set of features includes one or more of a roof area, a building area, a vegetation density, a roof material, a roof quality, a roof height, a roof pitch, presence of a skylight, a portion of a roof covered by skylights, presence of a solar panel, a portion of the roof covered by solar panels, a number of roof facets, a roof shape, a land cover code, a temperature, a precipitation type or metric, and an elevation.

11. A system comprising:
    a processor; and
    a memory, the memory storing instructions that, when executed by the processor, cause the system to:
        determine a set of training data for training a first damage severity model including:
            identify a set of properties that experienced hail damage, the set of training data for the first damage severity model including the identified set of properties that experienced hail damage;
            determine a first set of features associated with each property in the set of properties, the first set of features including one or more hail features at a location of the property, one or more property features describing an associated property, and one or more damage values;
determine a gain associated with each feature in the first set of features; and
determine a first subset of features from the first set of features by eliminating a second subset of features within the first set of features from the first set of training data for the first damage severity model, based on a gain threshold, wherein the first subset of features are associated with sufficient gain values to satisfy the gain threshold and the second subset of features are associated with insufficient gain values to satisfy the gain threshold;
train a first damage severity model based on the set of training data for the first damage severity model; and
validate the first damage severity model.

12. The system of claim 11, the memory further storing instructions that, when executed by the processor, cause the system to:
receive a location;
apply the first damage severity model; and
present a damage severity.

13. The system of claim 12, wherein the damage severity is one or more of: a roof area damaged, a claim cost, and a cost of replacement.

14. The system of claim 12, the memory further storing instructions that, when executed by the processor, cause the system to:
determine, based on a determined damage severity, one or more of: a remedial action to reduce a risk of hail; whether to approve or deny hail insurance coverage or an insurance claim; an insurance premium associated with the location, an adjustment to an insurance premium associated with location; and to warn one or more of a property owner, resident, financier and insurer associated with the location of a risk of damage posed by hail.

15. The system of claim 11, wherein the set of properties that experienced hail damage includes one or more of a first property from hail claims data and a second property from building permit data, where a building permit associated with the second property indicates hail.

16. The system of claim 11, wherein identifying the set of properties that experienced hail damage comprises:
obtaining an initial set of properties that experienced hail damage;
eliminating, from the initial set of properties, properties unassociated with a damage value;
eliminating, from the initial set of properties, one or more properties under construction; and
identifying, as the set of properties that experienced hail damage, a remaining set of properties.

17. The system of claim 16, wherein a threshold is associated with one or more of a maximum roof size, a minimum roof size, a maximum damage value, a minimum damage value, and an outlier.

18. The system of claim 11, wherein the first damage severity model is a regression model.

19. The system of claim 11, wherein the first damage severity model is a classifier.

20. The system of claim 11, wherein the first set of features includes one or more of a roof area, a building area, a vegetation density, a roof material, a roof quality, a roof height, a roof pitch, presence of a skylight, a portion of a roof covered by skylights, presence of a solar panel, a portion of the roof covered by solar panels, a number of roof facets, a roof shape, a land cover code, a temperature, a precipitation type or metric, and an elevation.

* * * * *